US010391408B2

United States Patent
Ord et al.

(10) Patent No.: US 10,391,408 B2
(45) Date of Patent: Aug. 27, 2019

(54) SYSTEMS AND METHODS TO FACILITATE USER INTERACTIONS WITH VIRTUAL OBJECTS DEPICTED AS BEING PRESENT IN A REAL-WORLD SPACE

(71) Applicant: Disney Enterprises, Inc., Burbank, CA (US)

(72) Inventors: Tracia Ord, Santa Clarita, CA (US); Anthony Accardo, Los Angeles, CA (US); Stephanie Glover, Burbank, CA (US); Evan Binder, Calabasas, CA (US); Jocelyn McDowell, Burbank, CA (US); Anna Singer, Los Angeles, CA (US); Jillian Foster, Riverside, CA (US); Patrick Hovsepian, Glendale, CA (US); Christopher Abbey, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/627,221

(22) Filed: Jun. 19, 2017

(65) Prior Publication Data

US 2018/0361260 A1 Dec. 20, 2018

(51) Int. Cl.
*A63F 13/213* (2014.01)
*G06F 3/01* (2006.01)
(Continued)

(52) U.S. Cl.
CPC ............ *A63F 13/92* (2014.09); *A63F 13/213* (2014.09); *G06F 3/011* (2013.01); *G06T 19/006* (2013.01)

(58) Field of Classification Search
None
See application file for complete search history.

(56) References Cited

U.S. PATENT DOCUMENTS

| 7,948,481 B2 | 5/2011 | Vilcovsky |
| 8,872,854 B1 | 10/2014 | Levitt |

(Continued)

FOREIGN PATENT DOCUMENTS

WO      2017108699      6/2017

OTHER PUBLICATIONS

Smith, David, This may be the most impressive use of Apple's new AR software yet, Business Insider (Jul. 11, 2017) retrieved from: http://www.businessinsider.com/apple-arkit-portal-video-2017-7.

(Continued)

*Primary Examiner* — Damon J Pierce
(74) *Attorney, Agent, or Firm* — Esplin & Associates, PC

(57) ABSTRACT

This disclosure presents systems and methods to facilitate user interactions with virtual objects depicted as being present in a real-world space. A representation of a first location in a real-world space may include one or more virtual objects depicted in the representation of the first location as being present in the first location. An orientation of a computing platform physically present at a second location may be obtained. An image may be generated based on one or more of the representation of the first location, the orientation, and/or other information. The image may depict the representation of the first location within a field of view of the real-world space and one or more virtual objects depicted as being present in the first location within the field of view. The user may interact with virtual object depicted as being present in the first location within the field of view.

20 Claims, 4 Drawing Sheets

(51) Int. Cl.
*A63F 13/92* (2014.01)
*G06T 19/00* (2011.01)

(56) References Cited

U.S. PATENT DOCUMENTS

| | | | |
|---|---|---|---|
| 9,092,061 | B2 | 7/2015 | Elmekies |
| 9,240,077 | B1 | 1/2016 | Kraft |
| 9,348,141 | B2 | 5/2016 | Bar-Zeev |
| 9,350,924 | B2 | 5/2016 | Posa |
| 9,904,055 | B2 | 2/2018 | Burns |
| 2012/0038671 | A1 | 2/2012 | Min |
| 2012/0105473 | A1* | 5/2012 | Bar-Zeev .............. G02B 27/017 345/633 |
| 2013/0145272 | A1 | 6/2013 | Boggie |
| 2013/0178257 | A1* | 7/2013 | Langseth ................ G06T 17/05 463/4 |
| 2014/0354690 | A1 | 12/2014 | Walters |
| 2015/0016777 | A1 | 1/2015 | Abovitz |
| 2015/0235370 | A1 | 8/2015 | Abovitz |
| 2015/0371447 | A1 | 12/2015 | Yasutake |
| 2016/0026253 | A1 | 1/2016 | Bradski |
| 2016/0189334 | A1 | 6/2016 | Mason |
| 2016/0292535 | A1 | 10/2016 | Thorn |
| 2016/0300387 | A1 | 10/2016 | Ziman |
| 2017/0160815 | A1 | 6/2017 | Glazier |
| 2017/0169598 | A1 | 6/2017 | York |
| 2017/0169610 | A1* | 6/2017 | King .................... G02B 27/017 |
| 2018/0059902 | A1 | 3/2018 | Martin |
| 2018/0096528 | A1 | 4/2018 | Needham |
| 2018/0101985 | A1 | 4/2018 | Jones-McFadden |
| 2018/0361260 | A1 | 12/2018 | Ord |
| 2018/0364799 | A1 | 12/2018 | Ord |

OTHER PUBLICATIONS

Rukeja, Sumeet, Building AR Portal: A Door to Fascinating AR Experience, Yudiz (May 22, 2018) retrieved from: https://www.yudiz.com/building-ar-portal-a-door-to-fascinating-ar-experience/.

Advanced Micro Devices, Inc. (May 25, 2018), AMD Technology Enabling ARwall's Real-Time Virtual Set Extension Tools [Video file], Retrieved from https://www.youtube.com/watch?v=cC7iPZatS1E.

Shaoib, Huma, et al., A Survey of Augmented Reality, Artificial Intelligence and Multidisciplinary (AIM) Research Lab, Research Gate, retrieved on Nov. 1, 2016, 10 pages.

* cited by examiner

SYSTEMS AND METHODS TO FACILITATE USER INTERACTIONS WITH VIRTUAL OBJECTS DEPICTED AS BEING PRESENT IN A REAL-WORLD SPACE

FIELD

This disclosure relates to systems and methods to facilitate user interactions with virtual objects depicted as being present in a real-world space.

BACKGROUND

Users may not be able to attend events (e.g., concerts, award shows, and/or other events) for many reasons. However, those users may wish to engage with an event even when they are not physically present at the event.

SUMMARY

One aspect of the disclosure relates to a system configured to configured to facilitate user interactions with virtual objects depicted as being present in a real-world space. Virtual object may be depicted within a representation of a location in the real-world space as being physically present at the location. The representation of the location within a field of view of the real-world space may be determined and presented via a display of a computing platform associated with a user. The field of view may depend on the orientation of the computing platform. The computing platform may be physically present at a different location. The computing platform may provide a window to view into the location as it is moved around by the user. The user may interact with virtual objects depicted as being present at the location within the field of view presented on the computing platform. The interaction may be in accordance with gameplay.

The system may include one or more of one or more servers, one or more computing platforms, and/or other components. The one or more servers may include one or more physical processors. The one or more servers may communicate with one or more computing platforms via client/server architecture, and/or other communication schemes. The one or more physical processors may be configured by machine-readable instructions. Executing the machine-readable instructions may cause the one or more physical processor to facilitate user interactions with virtual objects depicted as being present in a real-world space. The machine-readable instructions may include one or more computer program components. The computer program components may include one or more of a space component, an orientation component, a presentation component, and/or other components.

The space component may be configured to obtain space information, and/or other information. The space information may define one or more representations of one or more locations in a real-world space. By way of non-limiting illustration, space information may define a representation of a first location in a real-world space. The first location in the real-world space may include real-world objects and/or people present in and/or moving through the real-world space. The representation of the first location including one or more virtual objects depicted in the representation of the first location as being present in the first location. Individual virtual objects may be configured to experience locomotion within the representation of the first location.

The orientation component may be configured to obtain orientation information, and/or other information. Orientation information may be derived from output signals generated by an orientation sensor of a computing platform. The orientation information may define an orientation of the computing platform at a second location in the real-world space.

The presentation component may be configured to generate image information and/or other information. Image information may be generated based on one or more of space information, orientation information, and/or other information. The image information may define an image, and/or other content. The image may depict the representation of the first location within a field of view of the real-world space at the first location, one or more virtual objects depicted in the first location within the field of view, and/or other content.

The presentation component may be configured to effectuate presentation of one or more images on one or more computing platforms. By way of non-limiting illustration, the image depicting the representation of the first location within the field of view of the real-world space at the first location may be presented via a display of the computing platform physically present at the second location.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
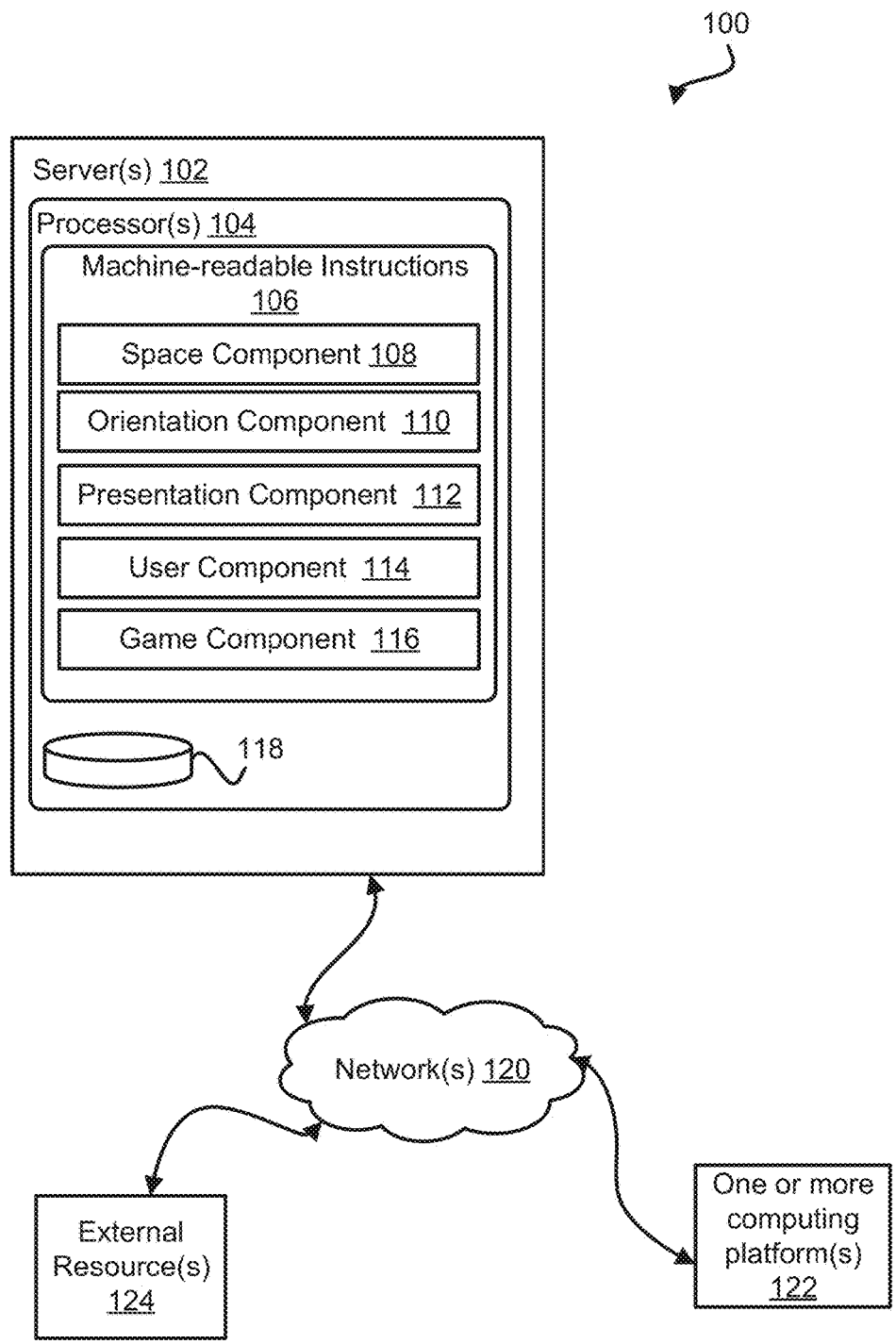
FIG. 1 illustrates a system configured to facilitate user interactions with virtual objects depicted as being present in a real-world space, in accordance with one or more implementations.

FIG. 1 illustrates a system 100 configured to facilitate user interactions with virtual objects depicted as being present in a real-world three-dimensional space, in accordance with one or more implementations. The location in the real-world space may include one or more real-world objects and/or one or more people present in and/or moving through the real-world space. A representation of the location may include one or more virtual objects depicted in the representation of the location as being present in the location. Individual virtual objects may be configured to experience locomotion within the representation of the location. The representation of the location in the real-world space may be presented to users via computing platforms associated with the user. The users may be physically present at different locations. The representation presented at a given computing platform may include a representation of the location within a particular field of view of the real-world space at the location. The field of view of the real-world space at the location may be determined in real time, or near real time, based on an orientation of a given computing platform associated with a given user physically present at a different location. In this sense, the computing platform may provide a window to view into the location as it is moved around by a user. A user may provide input via a computing platform to interact with one or more virtual objects visible within the representation of the location within the field of view presented on the computing platform.

The system 100 may include one or more of one or more servers 102, one or more computing platforms 122, and/or other components. The one or more servers 102 may include one or more of one or more physical processors 104, non-transitory electronic storage 118, and/or other components. The non-transitory electronic storage 118 may be configured to store information utilized by one or more servers 102, one or more computing platforms 122, and/or other components of system 100.

In some implementations, one or more servers 102 may be configured to provide remote hosting of features and/or functions of machine-readable instructions 106 to one or more computing platforms 122. The one or more computing platform 122 may be remotely located from one or more servers 102. The one or more servers 102 may communicate with one or more computing platforms 122 via client/server architecture, and/or other communication schemes. In some implementations, one or more features and/or functions of one or more servers 102 may be attributed as local features and/or functions of one or more computing platforms 122. For example, individual computing platforms may obtain machine-readable instructions that may be the same or similar to machine-readable instructions 106 of one or more physical processors 104. Individual computing platforms of one or more computing platforms 122 may include one or more of a mobile computing platform (e.g., one or more of a cellular telephone, a smartphone, a laptop, a tablet computer, a virtual reality platform, and/or other computing platforms), a stationary computing platform (e.g., a desktop computer), and/or other computing platforms. In some implementations, a virtual reality platform may include a virtual reality headset (e.g., goggles, glasses, and/or other headset), and/or other virtual reality platform.

Individual computing platforms of one or more computing platforms 122 may include one or more of a display, one or more sensors, and/or other components. A display may be configured to present one or more of individual images, image sequences, video, text, and/or other information. Presentation via a display of a computing platform may be facilitated by one or more processors of the computing platform and/or other components. By way of non-limiting example, presentation may be facilitated by a graphics processing unit (GPU) and/or other processing components of an individual computing platform. A display may include one or more of screen, a touchscreen, a monitor, a head-mounted display, and/or other displays.

Individual sensors of an individual computing platform may be configured to generate output signals. An individual sensor may include one or more of an orientation sensor, a location sensor, and/or other sensors.

In some implementations, an orientation sensor of a computing platform may be configured to generate output signals conveying orientation information and/or other information. Orientation information derived from output signals of an orientation sensor may define an orientation of the computing platform. In some implementations, orientation of a computing platform may refer to one or more of a pitch angle, a roll angle, a yaw angle, and/or other measurements. An orientation sensor may include an inertial measurement unit (IMU) such as one or more of an accelerometer, a gyroscope, a magnetometer, Inclinometers, Electronic nose, Infrared Imagers, Micro-bolometers, micro-displays (DMD), Digital micro-mirror device, Optical Switches, and/or other devices.

In some implementations, a location sensor of a computing platform may be configured to generate output signals conveying location information and/or other information. Location information derived from output signals of a location sensor may define one or more of a geo-location of the computing platform, an elevation of the computing platform, and/or other measurements. A location sensor may include one or more of a GPS, an altimeter, a pressure sensor, and/or other devices.

The one or more physical processors 104 may be configured by machine-readable instructions 106. Executing machine-readable instructions 106 may cause one or more physical processors 104 to facilitate user interactions with virtual objects depicted as being present in a real-world space. The machine-readable instructions 106 may include one or more computer program components. The one or more computer program components may include one or more of a space component 108, a an orientation component 110, a presentation component 112, a user component 114, a game component 116, and/or other components.

The space component 108 may be configured to obtain space information and/or other information. The space information may define one or more representations of one or more locations within a real-world space. An individual location in the real-world space may include one or more of one or more real-world objects, one or more people, and/or other entities present in and/or moving through the real-world space.

In some implementations, a representation of a location in a real-world space may include a three-dimensional digital model of the real-world space. In some implementations, a digital model may represent the real-world space virtually (e.g., as a virtual space). In some implementations, a digital model may represent the real-world space realistically (e.g., real-world virtual reality). One or more computer modeling techniques for creating a 3D digital model of a location by using depth maps may be used. Depth maps may be created using depth sensors, stereo cameras, and/or other devices. In some implementations, semiautomatic techniques may be used that may differentiate between foreground, background, and/or intermediate levels. Lighting of a 3D model may change depending on an hour, date, and/or climate forecast (e.g., rain may be simulated on the virtual world).

A three-dimensional model of the real-world space may be defined by one or more of appearance information, spatial information, and/or other information.

Appearance information defining at least part of a model of a location in the real-world space may include information defining one or more images of the location. Information defining one or more images of the location may be derived from output signals of one or more image sensors. The one or more image sensors may be placed at a reference point within the location. In some implementations, information conveyed from output signals of one or more image sensors may represent the location in the real-world space within a field-of-view of the one or more images sensor with respect to a reference point the one or more image sensors may be placed. In some implementations, information conveyed from output signals of an image sensor may define one or more of an image, an image sequence, a video, and/or other representations of the real-world space. An image may be defined by a set of pixels and/or other information. Individual pixels in the set of pixels may be defined by one or more of a pixel location, a pixel color, and/or other specifications. A pixel location may include a location on an image plane. Pixel color may be defined by chromaticity of colors specified within a color space, such as an RGB color space. An image sensor may include one or more of a charge-coupled device sensor, an active pixel sensor, a complementary metal-oxide semiconductor sensor, an N-type metal-oxide-semiconductor sensor, and/or other devices.

In some implementations, spatial information may model physical dimensions of a location in the real-world space. Spatial information may include a depth map of the location and/or other information. A depth map may be generated by one or more depth cameras and/or other devices. The one or more depth cameras may be placed at a reference point within the location. The reference point of the one or more depth camera may be the same as or similar to a reference point where one or more image sensors may be placed. Depth cameras may be configured to generate real-time depth maps of a real-world space. A depth map may include a set of points (also known as a point cloud). Individual points in a depth map may correspond to a discrete range measurement from the reference point as captured by the depth camera to a surface lying in the real-world. A depth camera may include one or more of a laser range scanner, a time-of-flight camera, an illumination unit, an image sensor, driver electronics, computation/Interface RF-modulated light sources with phase detectors, and/or other devices.

In some implementations, appearance information and spatial information may be combined to generate a model. For example, real-world objects, people, surfaces, and/or other content depicted in one or more images of the real-world space may be mapped to corresponding locations specified by the spatial information in order to realistically model both the visual appearance and the physical dimensions of the physical space. By way of non-limiting illustration, a model of a location of a real-world space may comprise a real-world virtual reality model providing 360 degree views of the location.

In some implementations, space component 108 may be configured to obtain space information defining a representation of a real-world space at a closed location in the real-world space. A closed location may include a building interior (e.g., a room, a hallway, and/or other closed interior space of a building), and/or other locations.

In some implementations, space information defining a representation of a location in a real-world space may further define one or more virtual objects depicted as being present in the location. Individual virtual objects may be configured to experience locomotion within a representation of a location. For example, a virtual object may be depicted as being present in and/or moving through the location.

In some implementations, virtual objects may having one or more visual depictions. By way of non-limiting illustration, a virtual object may depict one or more of a real-world entity (e.g., humans and/or animals), a fantastical entity (e.g., one or more of monsters, aliens, animated movie/TV characters, and/or other entities), a real-world object (e.g., furniture), a shape (e.g., a star-shape), and/or other entities and/or objects.

In some implementations, spatial information used to generate a representation of a location of real-world space (e.g., three-dimensional model) may allow for one or more virtual object depicted in the representation of the location to be at least partially occluded by one or more real-world objects and/or persons present in and/or moving through the real-world space. By way of non-limiting illustration, spatial information may provide knowledge of the physical dimensions of the location such that virtual objects may be depicted as moving through the location much like a real-world object and/or person physically present at the location. Virtual objects may be placed at and/or may translate to (e.g., experience locomotion) one or more locations behind (e.g., occluded by) and/or in front of real-world objects and/or persons present at the location (see, e.g., FIG. 5).

The orientation component 110 may be configured to obtain orientation information derived from output signals generated by one or more orientation sensors of one or more computing platforms. By way of non-limiting illustration, orientation information for a computing platform may define orientation of the computing platform over one or more points in time. In some implementations, output signals generated by one or more orientation sensors may be sampled in real-time, near real-time, at specified intervals, and/or at other points in time.

The presentation component 112 may be configured to generate image information for one or more users. Image information may define one or more of individual images, image sequences, video, and/or other content. Image information may be generated based on one or more of space information (e.g., via space component 108), orientation information (e.g., via orientation component 110), and/or other information. An image (and/or image sequence and/or video) may depict one or more of a representation of a location in the real-world space within a field of view of the real-world space at the location, one or more virtual objects depicted as being present in the location within the field of view, and/or other content. In some implementations, the field of view of the real-world space at the location may be determined based on an orientation of a computing platform physically present at a different location.

The presentation component 112 may be configured to determine a field-of-view of the real-world space at a location (e.g., a first location) in the real-world space based on an orientation of a computing platform associated with a user who may be physically present at a different location (e.g., a second location). The field-of-view of the real-world space at the first location may include a portion of the real-world space at the first location that falls within the field of view. The orientation of the computing platform may be used to determine a corresponding orientation within the representation of the first location (e.g., the three-dimensional model of the first location). The corresponding orientation within the representation of the real-world space at the first location may determine the field-of-view within the representation of the first location (e.g., the three-dimensional model).

In some implementations, the corresponding orientation within the representation of the first location may be determined with respect to a reference point in the real-world space at the first location. The reference point may include, for example, a point where one or more devices (e.g., image sensors, depth sensors, and/or other devices) may have been placed in the first location in the real-world space when collecting information (e.g., appearance information and/or spatial information) to generate a model. A representation of a portion of the location in the real-world space within the field-of-view in the first location corresponding to the orientation of the computing platform in the second location may be determined. As changes in orientation of the computing platform may be made by the user in the second location, the field of view of the real-world space at the first location may be updated, resulting in an corresponding representation of the first location being updated. The computing platform physically present at the second location may act as a window into the first location in the real-world space.

In some implementations, presentation component 112 may be configured to effectuate presentation, on individual computing platforms, of views of one or more of one or more representations of one or more locations in the real-world space within one or more fields of view of the real-world space, one or more virtual objects depicted as being presenting within the one or more locations, and/or other information.

In some implementations, presentation component 112 may be configured to obtain pre-recorded broadcasts (e.g., videos) of one or more locations in the real-world space. The presentation component 112 may be configured to superimpose and/or overlay a representation of a location in the real-world space over a pre-recorded broadcast of the same location in the real-world space. In this manner, virtual objects depicted in the representation may also be depicted as being present at the location in the broadcast. The representation of the location provides knowledge of physical dimension of the location, while the pre-recorded broadcast may introduce one or more new real-world objects and/or persons (e.g., "new" meaning they may have not be present when a model was generated).

In some implementations, the pre-recorded video may be recorded as and/or generated as a equirectangular 360 video file. A hollow 3D sphere may be created with a corresponding UV map to match the equirectangular distortion of the video, and positioned in the center of the scene. The 360 video may be applied to the inside of the sphere as a material. The user may be spawned in the center of the scene, and virtual objects may be placed between the player and the edge of the sphere, and superimposed on to the video.

By way of non-limiting illustration, presentation component 112 may be configured to effectuate presentation on an individual computing platform of a view of a representation of a location in the real-world space within a field of view determined by an orientation of a computing platform associated with a user physically present at an other location. In some implementations, the representation may be presented in real-time based on real-time changes in orientation of the computing platform. In some implementations, the representation of the location in the real-world space within the field of view may be presented in conjunction with a pre-recorded broadcast (e.g., video) of the same location in the real-world space.

The user component 114 may be configured to obtain user input and/or other input. The user input from a user may include entry and/or selection by the user via a computing platform associated with the user. The user input may include entry and/or selection of individual virtual objects depicted in a representation of a location within a field of view of the real-world space presented on the computing platform. In some implementations, entry and/or selection may be facilitated through a display of the computing platform, such as a touchscreen display. By way of non-limiting illustration, the user may provide input for selecting virtual objects including one or more of tapping, swiping, holding, and/or other input on the touchscreen display.

The game component 116 may be configured to facilitate gameplay based on one or more of individual virtual objects depicted in a representation of a location of a real-world space within a field of view of the real-world space presented on one or more computing platforms, user input, and/or other information. In some implementations, a game may include one or more of a scavenger hunt, a racing game, a trivia game, fashion challenges, puzzles, "Pop Goes the Balloon" (e.g., users attempt to pop as many virtual objects in the form of balloons that may appear as flying around in an environment amongst regular balloons; popping the virtual balloons may reveal special images, etc.; popping a certain amount could advance to another round), and/or other games.

In some implementations, game component 116 may be configured to effectuate presentation of a game user interface on computing platforms associated with users. In some implementations, a game user interface may be overlaid on a representation of a location presented on a computing platform. In some implementations, a game user interface may include one or more user interface elements. A user interface element may include one or more of a game score indicator, a task description, avatar customization element, voice recognition through avatar activation, social feed/share button, avatar/multi-player Scoreboard, a comment Section and/or other elements. A task description may be provide information related to current gameplay, including, for example, a current task to be completed, a subsequent task to be completed, and/or other information. The game score indicator may display a game score and/or other information.

In some implementations, game component 116 may be configured to modify individual virtual objects based on user input, a particular game, and/or other information. In some implementations, modification may include one or more of causing one or more virtual objects to disappear, causing one or more virtual objects to experience locomotion, and/or other modifications. By way of non-limiting illustration, in a scavenger hunt game, users may search for virtual objects within a representation of a real-world location presented on their computing platform and may select the virtual objects when found. Selection may cause a "found" virtual object to disappear and/or experience locomotion (e.g., shake, jump, and/or other locomotion) to reflect the user input.

It is noted that the above description of gameplay and/or modifications to virtual objects are provided for illustrative purposes only and are not to be considered limiting. Instead, those skilled in the art that different types of gameplay and/or virtual object modifications may be provided within the scope of the present disclosure.

Figure 3:
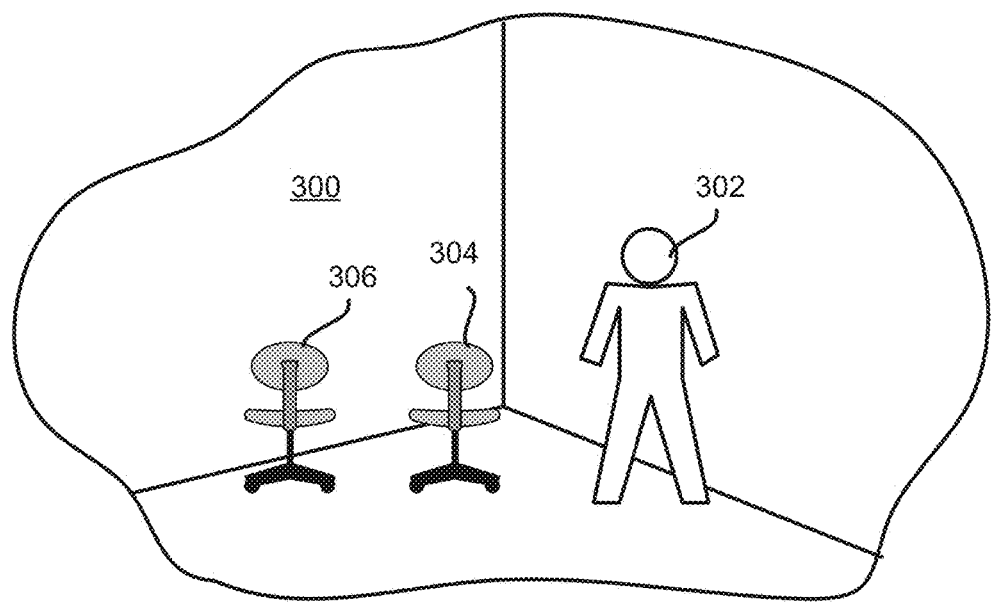
FIG. 3 illustrates a first location in a real-world space.

FIG. 3 illustrates a first location 300 in a real-world space. The first location 300 may include one or more of one or more people (e.g., person 302), one or more objects (e.g., first object 304, second object 306, and/or other objects), and/or other entities present in and/or moving through first location 300 in the real-world space.

Figure 4:
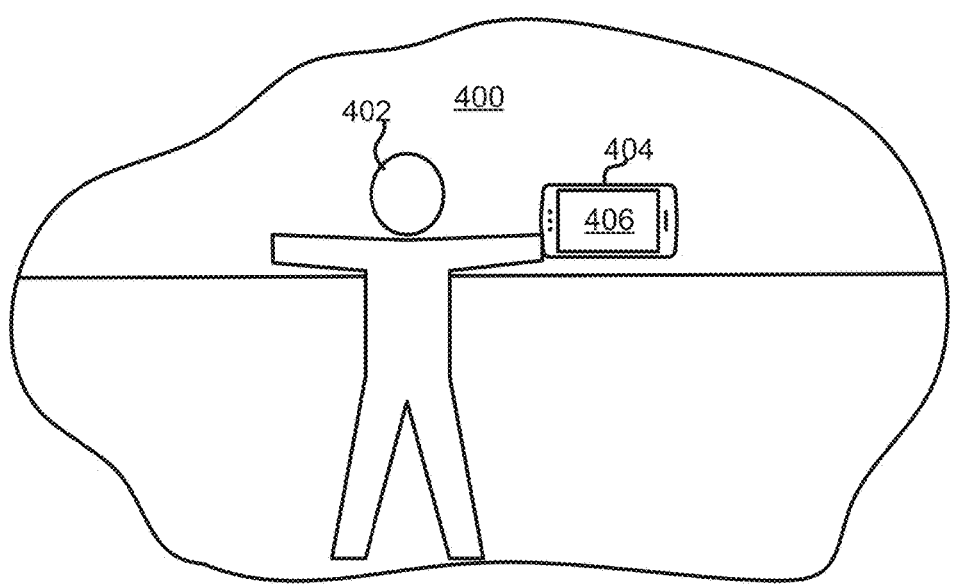
FIG. 4 illustrates a second location in a real-world space including a user of the system of FIG. 1.

FIG. 4 illustrates a second location 400 in real-world space including a user 402 of system 100 (FIG. 1). The user 402 may utilize a computing platform 404 (e.g., such as an individual one of one or more computing platforms 122 in FIG. 1), and/or other devices. The computing platform 404 may include a display 406, one or more sensors (e.g., an orientation sensor and/or other sensors), and/or other components. It is noted that the depiction of computing platform 404 comprising a handheld device (e.g., a smartphone) is provided for illustrative purposes only and is not to be considered limiting. For example, in some implementations, computing platform 404 may comprise a virtual reality platform and/or other computing platform. A virtual reality platform may be configured to provide the user an immersive experience into a different location. User input via a virtual reality platform may be provided by one or more of gesture and/or motion tracking/detection, input via an external device (e.g., a handheld controller, and/or other devices), and/or other input mechanisms.

Figure 5:
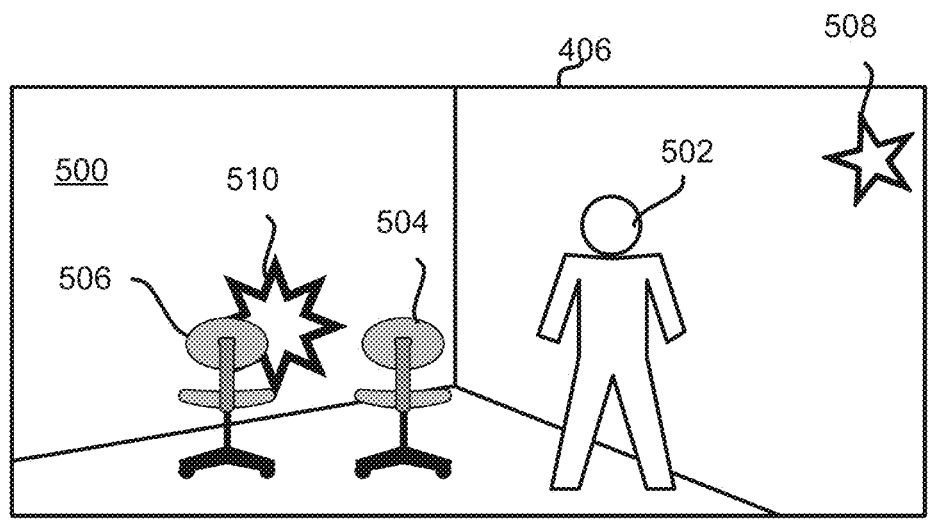
FIG. 5 illustrates a display of a computing platform of the user of FIG. 4 showing a representation of the first location within a first field of view including one or more virtual objects depicted as being present in the first location.

FIG. 5 illustrates display 406 of computing platform 404 of FIG. 4. The display 406 shows a representation 500 of first location 300 (FIG. 3) within a first field of view of the real-world space. The representation 500 may include one or more of a user representation 502 of user 302 (FIG. 3), a first object representation 504 of first object 304 (FIG. 3), a second object representation 506 of second object 306, one or more virtual objects depicted as being present in first location 300 within the first field of view, and/or other content. The one or more virtual objects depicted as being present in first location 300 within the first field of view may include one or more of a first virtual object 508, a second virtual object 510, and/or other virtual objects. Virtual object 506 may be depicted in representation 500 as being at least partially occluded by a second object representation 506. The first field of view of the real-world space may be determined based on an orientation of computing platform 404 (FIG. 4) at a first point in time.

Figure 6:
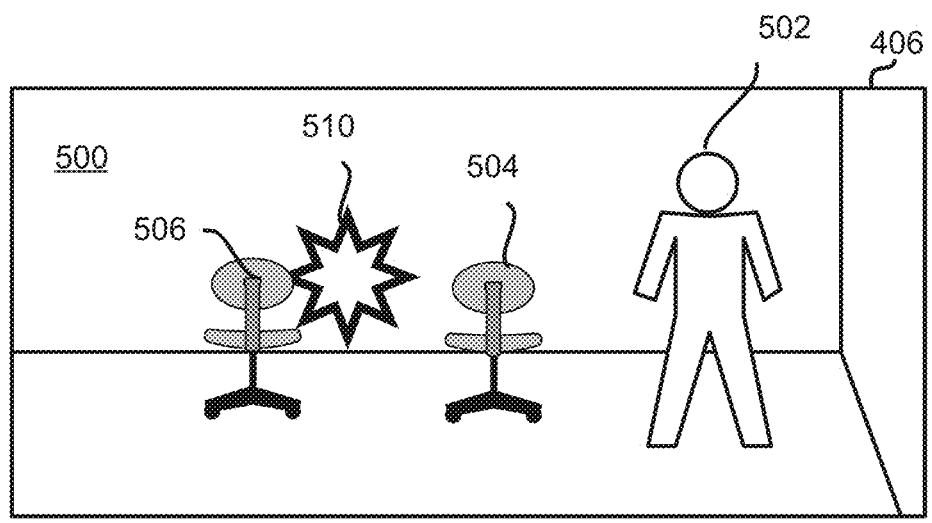
FIG. 6 illustrates a display of a computing platform of the user of FIG. 4 showing a representation of the first location within a second field of view including one or more virtual objects depicted as being present in the first location.

FIG. 6 illustrates display 406 of computing platform 404 of FIG. 4. The display 406 shows a representation 500 of first location 300 (FIG. 3) within a second field of view of the real-world space. The one or more virtual objects depicted as being present in first location 300 within the second field of view may include second virtual object 510, and/or other virtual objects. The second field of view of the real-world space may be determined based on an orientation of computing platform 404 (FIG. 4) at a second point in time. As shown, the second field of view may not include first virtual object 508. The relative position of second virtual object 510 relative a second object representation 506 of object 306 may also change.

The views of FIG. 5 and/or FIG. 6 may be used to facilitate gameplay. By way of non-limiting illustration, a user may provide input to select individual virtual objects in accordance with a scavenger hunt and/or other gameplay. As the user moves the computing platform 404 at the second location, the field of view shown on computing platform 404 may change, possibly revealing/uncovering other virtual objects.

Returning to FIG. 1, server(s) 102, one or more computing platforms 122, external resources 124, and/or other components may be operatively linked via one or more electronic communication links. For example, such electronic communication links may be established, at least in part, via one or more networks 120. One or more networks 120 may include the Internet and/or other networks. It will be appreciated that this is not intended to be limiting and that the scope of this disclosure includes implementations in which components of system 100 may be operatively linked via some other communication media.

External resources 124 may include sources of information, hosts, and/or providers of information outside of system 100, external entities participating with system 100, and/or other resources. In some implementations, some or all of the functionality attributed herein to external resources 124 may be provided by resources included in system 100.

Server(s) 102 may include communication lines or ports to enable the exchange of information with a network and/or computing platform(s) 122. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may include electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 122, and/or other information that enables system 100 to function as described herein.

Processor(s) 104 may be configured to provide information-processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-116 by software; hardware; firmware; some combination of software, hardware, and/or firmware; and/or other mechanisms for configuring processing capabilities on processor(s) 104.

It should be appreciated that although components 108-116 are illustrated in FIG. 1 as being co-located within a single processing unit, in implementations in which processor(s) 104 includes multiple processing units, one or more of components 108-116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Figure 2:
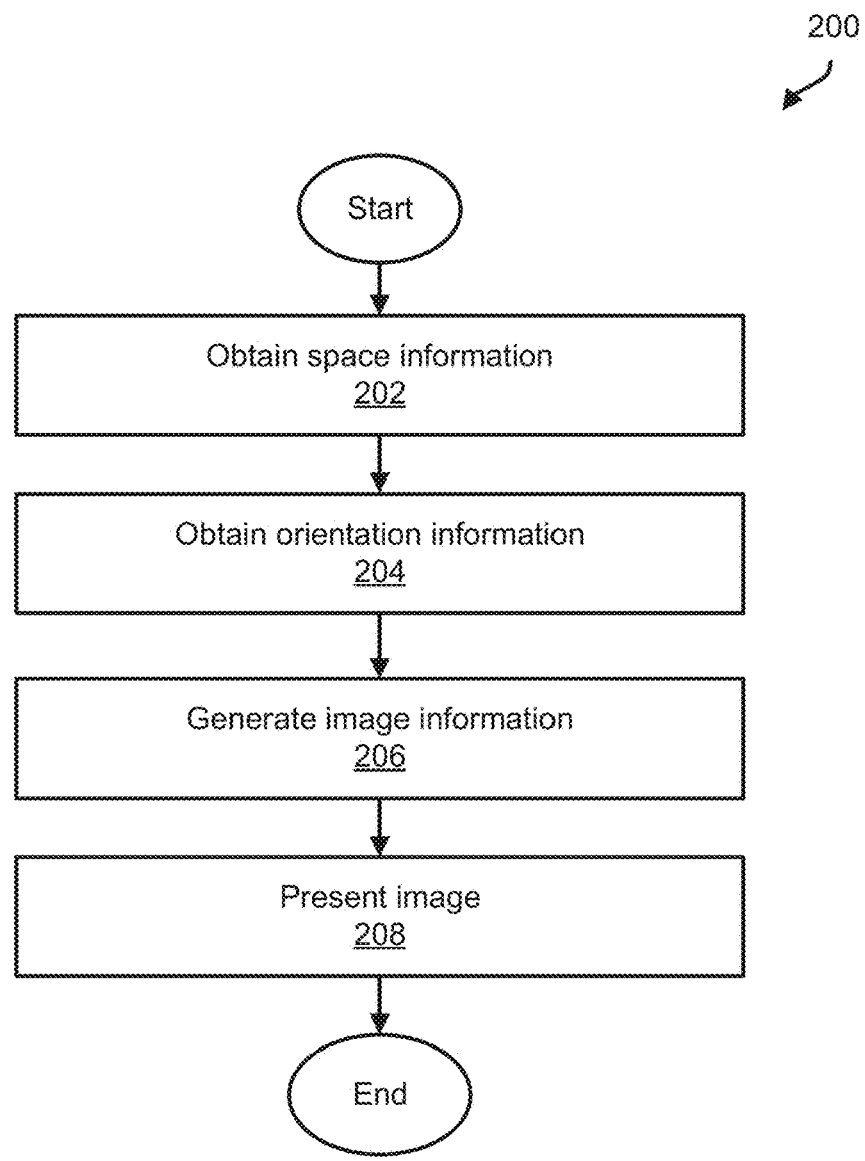
FIG. 2 illustrates a method to facilitate user interactions with virtual objects depicted as being present in a real-world space, in accordance with one or more implementations.

FIG. 2 illustrates a method 200 to facilitate user interactions with virtual objects depicted as being present in a real-world space, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, space information may be obtained. The space information may define one or more representations of one or more locations in a real-world space. By way of non-limiting illustration, space information may define a representation of a first location in a real-world space. The first location in the real-world space may include real-world objects and/or people present in and/or moving through the real-world space. The representation of the first location including one or more virtual objects depicted in the representation of the first location as being present in the first location. Individual virtual objects may be configured to experience locomotion within the representation of the first location. In some implementations, operation 202 may be performed by one or more physical processors executing a space component the same as or similar to space component 108 (shown in FIG. 1 and described herein).

At an operation 204, orientation information may be obtained. Orientation information may be derived from output signals generated by an orientation sensor of a computing platform. The orientation information may define an orientation of the computing platform at a second location in the real-world space. In some implementations, operation 204 may be performed by one or more physical processors executing a orientation component the same as or similar to orientation component 110 (shown in FIG. 1 and described herein).

At an operation 206, image information may be generated. Image information may be generated based on one or more of space information, orientation information, and/or other information. The image information may define an image, and/or other content. The image may depict the representation of the first location within a field of view of the real-world space at the first location, one or more virtual objects depicted in the first location within the field of view, and/or other content. In some implementations, operation 206 may be performed by one or more physical processors executing an presentation component the same as or similar to presentation component 112 (shown in FIG. 1 and described herein).

At an operation 208, one or more images may be presented on one or more computing platforms. By way of non-limiting illustration, the image depicting the representation of the first location within a field of view of the real-world space at the first location may be presented via a display of the computing platform physically present at the second location. In some implementations, operation 208 may be performed by one or more physical processors executing an presentation component the same as or similar to presentation component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate user interactions with virtual objects depicted as being present in a real-world space, the system comprising:
　　one or more physical processors configured by machine-readable instructions to:
　　　　obtain space information, the space information defining a representation of a first location in a real-world space, the first location in the real-world space including real-world objects and/or people present in and/or moving through the real-world space, the representation of the first location including one or more virtual objects depicted in the representation of the first location as being present in the first location, individual virtual objects being configured to experience locomotion within the representation of the first location;
　　　　obtain orientation information derived from output signals generated by an orientation sensor of a computing platform associated with a user, the orientation information defining an orientation of the computing platform physically present at a second location in the real-world space, the second location being a separate and distinct physical region in the real-world space from the first location;
　　　　generate image information based on the space information and the orientation information, the image information defining an image, the image depicting the representation of the first location within a field of view of the real-world space at the first location and the one or more virtual objects depicted in the first location within the field of view, wherein the field of view of the real-world space at the first location is determined based on the orientation of the computing platform physically present at the second location; and effectuate presentation of the image via a display of the computing platform.

2. The system of claim 1, wherein the one or more physical processors are further configured by machine-readable instructions to:

obtain user input via the computing platform, the user input including entry and/or selection by the user of individual ones of the individual virtual objects depicted in the representation of the first location within the field of view; and modify the individual ones of the individual virtual objects based on the user input.

3. The system of claim 2, wherein modifying the individual ones of the individual virtual objects based on the user input is in accordance with a game.

4. The system of claim 3, wherein the game is a scavenger hunt for virtual objects.

5. The system of claim 3, wherein the one or more physical processors are further configured by machine-readable instructions to:

effectuate presentation of a game user interface on the computing platform.

6. The system of claim 1, wherein the one or more virtual objects include a first virtual object, and wherein the first virtual object is depicted in the representation of the first location as being at least partially occluded by a first real-world object and/or a first person in and/or moving through the real-world space.

7. The system of claim 1, wherein the one or more physical processors are further configured by machine-readable instructions to:

determine the field of view of the real-world space within the representation of the first location in the real-world space based on the orientation of the computing platform physically present at the second location.

8. The system of claim 7, wherein the field of view is updated in real time based on changes in orientation of the computing platform at the second location.

9. The system of claim 1, wherein the one or more physical processors are further configured by machine-readable instructions to:

obtain a pre-recorded video of the first location in the real-world space; and superimpose the representation of the first location in the real-world space over the pre-recorded video of the first location in the real-world space.

10. The system of claim 1, wherein the computing platform is mobile.

11. A method to facilitate user interactions with virtual objects depicted as being present in a real-world space, the method being implemented in a computer system comprising one or more physical processors and storage media storing machine-readable instructions, the method comprising:

storing space information, the space information defining a representation of a first location in a real-world space, the first location in the real-world space including real-world objects and/or people present in and/or moving through the real-world space, the representation of the first location including one or more virtual objects depicted in the representation of the first location as being present in the first location, individual virtual objects being configured to experience locomotion within the representation of the first location;

obtaining orientation information derived from output signals generated by an orientation sensor of a computing platform associated with a user, the orientation information defining an orientation of the computing platform physically present at a second location in the real-world space, the second location being a separate and distinct physical region in the real-world space from the first location;

generating image information based on the space information and the orientation information, the image information defining an image, the image depicting the representation of the first location within a field of view of the real-world space at the first location and the one or more virtual objects depicted in the first location within the field of view, wherein the field of view of the real-world space at the first location is determined based on the orientation of the computing platform physically present at the second location; and effectuating presentation of the image via a display of the computing platform.

12. The method of claim 11, further comprising:

obtaining user input via the computing platform, the user input including entry and/or selection by the user of individual ones of the individual virtual objects depicted in the representation of the first location within the field of view; and modifying the individual ones of the individual virtual objects based on the user input.

13. The method of claim 12, wherein modifying the individual ones of the individual virtual objects based on the user input is in accordance with a game.

14. The method of claim 13, wherein the game is a scavenger hunt for virtual objects.

15. The method of claim 13, further comprising:

presenting a game user interface on the computing platform.

16. The method of claim 11, wherein the one or more virtual objects include a first virtual object, and wherein the first virtual object is depicted in the representation of the first location as being at least partially occluded by a first real-world object and/or a first person in and/or moving through the real-world space.

17. The method of claim 11, further comprising:

determining the field of view of the real-world space within the representation of the first location in the real-world space based on the orientation of the computing platform physically present at the second location.

18. The method of claim 17, wherein the field of view is updated in real time based on changes in orientation of the computing platform at the second location.

19. The method of claim 11, further comprising:

obtaining a pre-recorded video of the first location in the real-world space; and superimposing the representation of the first location in the real-world space over the pre-recorded video of the first location in the real-world space.

20. The method of claim 11, wherein the computing platform is a mobile computing platform.

* * * * *